(12) United States Patent
Groen in't Woud et al.

(10) Patent No.: US 6,217,960 B1
(45) Date of Patent: Apr. 17, 2001

(54) INTERIOR COATING MATERIAL FOR CONTAINER CLOSURES

(75) Inventors: Wilhelmina Andrea Marie Groen in't Woud; Johannes Schoots, both of Tiel (NL)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/367,770

(22) PCT Filed: Feb. 19, 1998

(86) PCT No.: PCT/EP98/00943

§ 371 Date: Dec. 6, 1999

§ 102(e) Date: Dec. 6, 1999

(87) PCT Pub. No.: WO98/37159

PCT Pub. Date: Aug. 27, 1998

(30) Foreign Application Priority Data

Feb. 21, 1997 (DE) ............................... 197 06 810

(51) Int. Cl.[7] ............................ B29D 23/00; B32D 1/08; B65D 43/00
(52) U.S. Cl. ..................... 428/35.8; 524/492; 524/497; 524/423; 524/493; 524/494
(58) Field of Search .................................. 524/492, 493, 524/494, 497, 423; 428/35.8

(56) References Cited

U.S. PATENT DOCUMENTS

| 3,183,144 | 5/1965 | Caviglia | 161/252 |
|---|---|---|---|
| 5,514,433 | 5/1996 | Cole | 428/35.8 |

FOREIGN PATENT DOCUMENTS

| 2 029 629 | 6/1970 | (DE) . |
| 0 254 755 | 2/1988 | (EP) . |
| 0 346 173 | 12/1989 | (EP) . |
| 2155951 | 10/1972 | (FR) . |

*Primary Examiner*—James J. Seidleck
*Assistant Examiner*—U. K. Rajguru
(74) *Attorney, Agent, or Firm*—Deborah M. Altman; William J. Uhl

(57) ABSTRACT

Provided is a metal container with an interior coating material. The interior coating material includes a) at least one compound selected from acrylate resins and melamine resins, b) at least one halogenated polymer, c) a tint enhancing component including at least one compound selected from $TiO_2$, $SiO_2$, iron pigments, and $BaSO_4$, and d) a solvent component. Processes for preparing the interior coating material are also provided. Further provided is a container closure coated on the inside wall with the above-escribed interior coating material, as well as a method for producing the container closures.

8 Claims, No Drawings

INTERIOR COATING MATERIAL FOR CONTAINER CLOSURES

The invention relates to an interior coating material for container closures, based on resin, to a process for preparing such an interior coating material, and to uses of such an interior coating material for producing coated container closures which may or may not comprise sealing materials. —Container closures is the term for closures which are screwed on, placed on, inserted in or formed onto container apertures. Examples are screw caps or crown corks for food containers which hold at least partly liquid foods, liquid preserving agents or beverages. Container closures for this end use are subject to particular requirements. On the one hand, the sealing provided to the contents must be liquid-tight and, in the case for example of contents which include or give off gases, must be gastight as well. On the other hand, the base material of the container closures must be protected against corrosive attack by the contents. An interior coating material of the invention can in principle, however, be used for non-food container closures as well. Base materials employed in principle are both polymeric materials and metallic materials, examples being sheet iron (in general, coated electrolytically with tin), sheet aluminum or tinplate, the metallic materials in particular having acquired wider currency. Gastight sealing is generally achieved by means of a seal which is manufactured, for example, from an elastomer and which when the container is in the closed state is arranged in the region of the sealing faces of the container aperture and of the container closure. Seals of this kind are either prefabricated from an appropriate sealing material and inserted into the container closure or applied, as it were, as a coating on the inside of the container closure. In addition, however, it is generally necessary, especially when using metallic materials as the base materials for a container closure, to protect the entire inner face Of the container closure against corrosive attack by the contents through the application of an interior coating material. This interior coating material is then arranged between the sealing material and the base material of the container closure. The coating itself can be of single-coat or else multi-coat design, for example with a primer coat and a topcoat. In the latter case, the expression interior coating material designates a coating material for producing the topcoat. Consequently, such an interior coating material must on the one hand be suitable for food contact (in accordance with statutory regulations) and on the other hand must be chemically inert (to the contents). Also of particular importance is the fact that the interior coating material must show good adhesion both to the base material (or to the primer coat) and to the sealing material. Finally, the interior coating material is required to have physical properties which ensure no processing problems in the roller coating technology that is customary in the manufacture of container closures. In this technology, a tin-plated iron sheet, for example, is first of all provided with a coating of the interior coating material by means of roller coating. The container closures are then obtained from the coated sheet by means of cutting and/or shaping tools and are provided with the sealing material. In principle, however, it is possible to apply the sealing material to the coated sheet before cutting or shaping.

Interior coating materials of the type specified at the outset are known, for example, from reference U.S. Pat. No. 3,183,144. These known interior coating materials are formed essentially from synthetic resins. Examples indicated of synthetic resins are phenol-formaldehyde condensates, oleoresins and epoxy resins. A common feature of all these known interior coating materials is that their solids content is relatively low, namely below 40% by weight. It would in contrast be desirable to be able to operate with a higher solids content, since then less solvent would be required. Less solvent would entail not only lower solvent costs but also, in particular, a lower level of solvent emission on application. Moreover, according to experience to date, the solids content cannot be raised simply by adding, say, $TiO_2$, since this will adversely, affect the physical and/or chemical properties of the coating material. Up until now, therefore, a level of 40% by weight for the overall solids content has been regarded as an upper limit if processability, and physical and/or chemical properties, are still to satisfy these requirements.

Against this background, the technical problem on which the invention is based is to specify an interior coating material whose solids content is markedly increased but which nevertheless satisfies all the requirements in respect of the physical and/or chemical properties and processability, the adhesion between interior coating material and base material (or primer coat) and between interior coating material and sealant coat, and the resistance to aggressive contents.

In order to solve this technical problem the invention teaches an interior coating material for container closures, having the following components: a) a polymer from the group consisting of epoxy resins based on bisphenol A diglycidyl ether or bisphenol F diglycidyl ether, epoxidized novolaks, phenol-formaldehyde condensates, acrylate resins, polyester resins and melamine resins, or a mixture of such polymers, b) a halogenated polymer from the group consisting of polyvinyl chlorides (PVC), or a mixture of such halogenated polymers, c) a substance from the group consisting of $TiO_2$, $SiO_2$, $Fe_xO_y$ and $BaSO_4$, or a mixture of such substances, and d) a customary solvent or a mixture of such solvents, the amounts of components a), b) and c) employed being chosen subject to the proviso that the ready-to-apply interior coating material has an overall solids content of more than 40% by weight, with the proportion (based on the solids) of the employed component b) and c) to the employed component a) being greater than 0.5:1 and with the proportion (based on the solids) of component b) to component c) being within the range from 0.5:1 to 10:1. —Epoxidized novolaks are epoxidized polycondensates of formaldehyde and phenols, which are prepared under acid catalysis. Novolaks contain no methylol groups and belong to the group of the phenolic resins. It is also possible in principle, however, to employ phenolic resins which do not belong to the novolaks group. Acrylate resins are thermoplastic or heat-curable resins which are obtained by homo- or copolymerization of (meth)acrylic esters. Functional groups, such as hydroxyl or carboxyl groups, can be introduced by way of comonomers. Polyester resins are polycondensation products of carboxylic acids having a functionality of two or more with alcohols. Melamine resins are polycondensates of melamine with carbonyl compounds, especially with formaldehyde, possibly modified with urea and/or phenol. The group of the polyvinyl chlorides also includes those halogenated vinyl chloride polymers which are modified with, for example, (meth)acrylates, vinyl acetate, maleic acid, vinylidene chloride or acrylonitrile. Examples of customary solvents are butanol, butylglycol, diacetone alcohol (4-hydroxy-4-methyl-2-pentanone), hydrocarbons, and solvents obtainable commercially under the designations Imsol R or Solvesso 150. Imsol R is a mixture of dimethyl esters of adipic, glutaric and succinic acids.

The following substances are particularly preferred as components a) and c). A particularly suitable component a) is a preferably thermoplastic acrylate resin. Such resins preferably also comprise high molecular mass, non-crosslinking polyacrylate resins which as monomers preferably include acrylic acid, acrylonitrile, acrylamide and also modifications and mixtures thereof. The preferred component c) is essentially $TiO_2$. For coloring or for adjusting the gloss it is possible, for example, to add small amounts of iron oxide pigments ($Fe_xO_y$) and/or $SiO_2$.

The invention is based on the finding that the overall solids content of an interior coating material can surprisingly be raised without impairing the properties, especially the processability, if the ratio of the amounts of halogenated polymer and of substance from the group consisting of $TiO_2$, $SiO_2$, $Fe_xO_y$ and $BaSO_4$ are specially attuned to one another. A marked increase only in the proportion of, say, $TiO_2$ would lead not only to poorer processability but also to a marked impairment of the chemical resistance of a coating produced from such an interior coating material. An interior coating material of the invention, on the other hand, has the advantage that—with retention of all the necessary properties, i.e. adhesion to the substrate, adhesion to the sealant, chemical resistance of a resulting coating to contents, the possibility of producing virtually pore-free coatings (corrosion protection for the substrate) and good processability in the customary technology for producing container closures—a particularly high overall solids content and, consequently, a consider-able cost reduction in terms of the solvent, and a considerable reduction in the solvent emission on application, have been achieved. It has also been found, in addition to the good properties in the actual coating process, that, surprisingly, cutting tools which are employed in the course of the subsequent processing of the coated sheets are not worn down or stressed to any greater extent. The reason why this is surprising is that, from simple considerations based on the increase in the proportion of "hard" components (e.g. $TiO_2$ and PVC), greater cutting-tool wear would have been expected.

In a preferred embodiment of the invention an additional component present in the interior coating material is a substance from the group of the plasticizers, or a mixture of such substances. With regard to suitable plasticizers reference is made, for example, to DIN 7723, December 1987. Particularly preferred plasticizers are those from the group consisting of epoxidized oils, soya oil, linseed oil, low molecular mass polyesters and natural-product plasticizers.

Advantageously, the proportion of the employed components b) and c) to the employed component a) is greater than 1:1. The proportion of the halogenated polymer or of the mixture of such halogenated polymers to the substance that is employed from the group consisting of $TiO_2$, $SiO_2$, $Fe_xO_y$ and $BaSO_4$, or to the mixture of such substances, is preferably within the range from 1:1 to 4:1 and, with particular preference, within the range from 1:1 to 2:1. The amounts of components a), b) and c) that are employed are preferably chosen subject to the proviso that the ready-to-apply interior coating material has an overall solids content of more than 45% by weight, most preferably more than 50% by weight.

The invention also teaches a process for preparing an interior coating material as claimed in any of claims 1 to 5, in which a first portion of component a) is mixed with the total amount of component c) and with a first portion of component d) to give a pigment paste, and in which component b) is mixed with a second portion of component a) and with a second portion of component d) to give a PVC paste, the pigment paste and the PVC paste being mixed with one another, with or without the addition of a mixture of the remainder of component a) and of the remainder of component d), and in which the resulting mixture is stirred homogeneously. Furthermore, the invention teaches the use of an interior coating material of the invention for producing a container closure, the inside of the container closure being provided with a coating of the interior coating material, and the use of an interior coating material of the invention for producing container closures, in which the interior coating material is applied by means of roller coating technology to at least one side of a sheet of raw material, in particular a metal sheet, and where, after the interior coating material has cured fully to form a coating, the container closures are separated and shaped from the raw material sheet by means of punching, cutting and/or pressing tools and where a sealant coat is applied to the coating before or after the cutting or shaping of the container closures. Examples of suitable metal sheet materials are: tinplate, aluminum, chromated steel and tin-free steel. Specifically, the interior coating material can be applied directly to the raw material sheet, although it is also possible to interpose a primer between interior coating material and raw material sheet.

The invention is elucidated further below on the basis of examples which represent merely embodiments of the invention.

MATERIALS USED JOINTLY IN THE EXAMPLES

The acrylate resin employed was a noncross-linking thermoplastic acrylate resin of high molecular mass. The primer employed—where appropriate—was a material customary in food container technology, which is essentially an epoxy-phenol coating material with a relatively high content of phenol-formaldehyde resin. The sealing material employed was a material customary in food container technology. Customary materials are based, for example, on polymers (plasticizers, phthalates), silicones, epoxy esters or polyurethanes.

Example 1

A PVC paste was prepared from the following components: 22.03 parts by weight of the acrylate resin, 24.93 parts by weight of a halogenated polymer with the trade name Geon 178, 9.22 parts by weight of a solvent with the trade name Solvesso 150, 10.20 parts by weight of a solvent with the trade name Imsol R and 6.12 parts by weight of the solvent diacetone alcohol. A pigment paste was prepared from the following components: 18.31 parts by weight of $TiO_2$ (trade name TiPure R900), 1.76 parts by weight of a bisphenol A-formaldehyde condensate (butylated) with the trade name Uravar FB 210, 4.72 parts by weight of an epoxidized novolak with the trade name DEN 431 BS and 8.08 parts by weight of the solvent with the trade name Solvesso 150. 68.60 parts by weight of the abovementioned PVC paste were combined with 32.87 parts by weight of the abovementioned pigment paste, with the addition of 0.63 part by weight of an amorphous wax ester fraction of partially hydrogenated lanolin, having the trade name Lanocerin, 0.65 part by weight of phosphoric acid (85% strength in water, mixed beforehand in isopropanol before addition to the coating material) and 1.85 parts by weight of the solvent with the trade name Solvesso 150. The solids content of the interior coating material was 50.3% (9000 kg batch with a processing viscosity of 96 s in accordance with DIN 4 (cup) at 25° C.). The ratio of the amount of component b) to the amount of component c) was 2.84:1. The ratio of the amounts of components b) and c) to the amount of component a) was 1.34:1.

An interior coating material obtained in this way was applied to a primed, tin-plated iron sheet and stoved at 190° C. for 10 minutes. The resulting coating showed very good properties in terms of gloss, leveling behavior, flexibility, MEK resistance and corrosion resistance, in the case of the coating properties both before and after sterilization at 129° C. for 60 minutes.

Example 2

In a manner similar to that of Example 1, an interior coating material was prepared from the following components: 30.34 parts by weight of the acrylate resin from Example 1, 15.14 parts by weight of $TiO_2$ with the trade name TiPure R900, 19.49 parts by weight of the halogenated polymer with the trade name Geon 178, 2.69 parts by weight of the bisphenol A-formaldehyde condensate (butylated) with the trade name Uravar FB 210, 6.86 parts by weight of a novolak with the trade name DEN 431 BS, 6.40 parts by weight of butylglycol, 3.73 parts by weight of the solvent with the trade name Imsol R, 4.62 parts by weight of diacetone alcohol, 1.95 parts by weight of butanol, 0.85 part by weight of an amorphous wax ester fraction of partially hydrogenated lanolin with the trade name Lanocerin, 0.50 part by weight of isopropanol, 0.05 part by weight of phosphoric acid (concentration as in Example 1), 2.47 parts by weight of an epoxidized soya oil with the trade name Edenol D81, 4.71 parts by weight of the solvent with the trade name Solvesso 150 and 0.20 part by weight of an additive with the trade name Syloid 244.

The solids content of the resulting interior coating material was about 51%. The ratio of the amount of component b) to the amount of component c) was 1.29:1. The ratio of the amounts of components b) and c) to the amount of component a) was 0.82:1. The viscosity in accordance with DIN 4, 25°C., was 75". On storage below room temperature for 8 weeks there was only a slight rise in viscosity. Even after storage for 8 weeks in a warm room (40° C.) there was no gelling, thus demonstrating the outstanding long-term stability of the interior coating material. A coating produced with an interior coating material as per this example on a tin-plated iron sheet with a primer showed good leveling (virtually no stripes when processed by the roller application process), a gloss of about 70 (customary 60° measurement), excellent adhesion to the sealing material (both before and after normal sterilization and high-temperature sterilization at 129° C. in water for 60 minutes; crosshatch method), very good flexibility in the course of the further processing of the coated sheets by shaping, and an MEK resistance of 9 (double strokes with a cotton pad saturated with MEK).

Example 3

In a manner similar to that of Example 1, an interior coating material was prepared from the following components: 26.20 parts by weight of the acrylate resin from Example 1, 13.08 parts by weight of $TiO_2$ with the trade name TiPure R900, 25.23 parts by weight of the halogenated polymer with the trade name Geon 178, 2.31 parts by weight of the bisphenol A-formaldehyde condensate (butylated) with the trade name Uravar FB 210, 3.35 parts by weight of a bisphenol A diglycidyl ether with the trade name Epikote 880, 3.79 parts by weight of butylglycol, 15.14 parts by weight of diacetone alcohol, 5.90 parts by weight of butanol, 0.74 part by weight of an amorphous wax ester fraction of partially hydrogenated lanolin with the trade name Lanocerin, 0.43 part by weight of isopropanol, 0.05 part by weight of phosphoric acid (concentration as in Example 1 and 3.78 parts by weight of the solvent with the trade name Solvesso 150.

The solids content of the resulting interior coating material was about 52%. The ratio of the amount of component b) to the amount of component c) was 1.93:1. The ratio of the amounts of components b) and c) to the amount of component a) was 1.34:1. The viscosity in accordance with DIN 4, 25° C., was 64". On storage below room temperature for 8 weeks there was only a slight rise in viscosity. Even after storage for 8 weeks in a warm room (40° C.) the viscosity rose to only 78". A coating produced with an interior coating material as per this example on a tin-plated iron sheet with a primer showed good leveling a gloss of better than 70, excellent adhesion to the sealing material (both before and after normal sterilization and high-temperature sterilization at 129° C. in water for 60 minutes), a flexibility much better even than Example 2 in the course of the further processing of the coated sheets by shaping, and an MEK resistance of 9 (double strokes with a cotton pad saturated with MEK).

What is claimed is:

1. A metal container with an interior coating material, said interior coating material comprising
    a) at least one compound selected from acrylate resins and melamine resins,
    b) at least one halogenated polymer,
    c) a tint enhancing component comprising at least one compound selected from the group consisting of: $TiO_2$, $SiO_2$, iron pigments, and $BaSO_4$, and
    d) a solvent component,
   wherein the amounts of components a), b) and c) employed being chosen such that said interior coating material has a solids content of at least 40% by weight,
   wherein the proportion, based on the solids, of components b) and c) to component a) is greater than 0.5:1, and
   wherein the proportion, based on the solids, of component b) to component c) ranges from 0.5:1 to 10:1.

2. The interior coating material as claimed in claim 1, further comprising at least one plasticizer component.

3. The interior coating material as claimed in claim 1, wherein the proportion of the components b) and c) to component a) is greater than 1:1.

4. The interior coating material as claimed in claim 1, wherein the proportion of component b) to component c) ranges from 1:1 to 4:1.

5. The interior coating material as claimed in claim 1, wherein the amounts of components a), b) and c) that are employed are chosen so that the interior coating material has an overall solids content of more than 45% by weight.

6. A process for preparing an interior coating material as claimed in claim 1 comprising the following steps
    (1) mixing a first portion of component a) with the total amount of component c) and a first portion of component d) to form a pigment paste,
    (2) mixing component b) with a second portion of component a) and a second portion of component d) to form a halogenated polymer paste, and
    (3) mixing the pigment paste of step (1) and the halogenated polymer paste of step (2).

7. A container closure, wherein at least a portion of said container closure's inside wall surface is coated with the interior coating material of claim 1.

8. A method for producing container closures, wherein at least a portion of said container closure's inside wall surface is coated with the interior coating material of claim 1, said method comprising the steps of
  (1) applying said interior coating material to at least one side of a metal sheets,
  (2) curing the interior coating material upon the metal sheet to produce a coated metal sheet,
  (3) optionally, applying a sealant coat to the coated metal sheet,
  (4) cutting and shaping the container closures from the coated metal sheet of step (2) or, optionally of step (3), and,
  (5) optionally, applying a sealant coat to the container closures formed from the coated metal sheet of step (3).

* * * * *

UNITED STATES PATENT AND TRADEMARK OFFICE
CERTIFICATE OF CORRECTION

PATENT NO. : 6,217,960 B1
DATED : April 17, 2001
INVENTOR(S) : Groen in't Woud et al.

It is certified that error appears in the above-identified patent and that said Letters Patent is hereby corrected as shown below:

Abstract,
Line 9, delete the word "above-escribed" and replace it with -- above-described --.

Column 7,
Line 4, in step (1), delete the word "sheets" and replace it with -- sheet --;
Line 7, in step (3), delete the term "optionally,";

Column 8,
Line 3, in step (4), delete the term "optionally" and
Line 5, in step (5), delete the term "optionally,".

Signed and Sealed this

Sixth Day of November, 2001

Attest:

*Nicholas P. Godici*

NICHOLAS P. GODICI
*Attesting Officer*   *Acting Director of the United States Patent and Trademark Office*

UNITED STATES PATENT AND TRADEMARK OFFICE
CERTIFICATE OF CORRECTION

PATENT NO.    : 6,217,960 B1
DATED         : April 17, 2001
INVENTOR(S)   : Groen in't Woud et al.

It is certified that error appears in the above-identified patent and that said Letters Patent is hereby corrected as shown below:

Title page,
Item [57], ABSTRACT,
Line 9, delete the word "above-ecribed" and replace it with -- above-described --.

Column 7,
Line 4, in step (1), delete the word "sheets" and replace it with -- sheet --;
Line 7, in step (3), delete the term "optionally,";

Column 8,
Line 3, in step (4), delete the term "optionally" and
Line 5, in step (5), delete the term "optionally,".

Signed and Sealed this

Fifth Day of October, 2004

JON W. DUDAS
*Director of the United States Patent and Trademark Office*